US012733078B2

(12) United States Patent
Beagley et al.

(10) Patent No.: US 12,733,078 B2
(45) Date of Patent: Sep. 8, 2026

(54) APPARATUSES, SYSTEMS, AND METHODS FOR CONTROLLING ELECTRICAL POWER FOR LIGHTING LOADS

(71) Applicant: Snap One, LLC, Lehi, UT (US)

(72) Inventors: James Beagley, Fountain Green, CT (US); Jon A Nelson, Bluffdale, UT (US)

(73) Assignee: Snap One, LLC, Lehi, UT (US)

( * ) Notice: Subject to any disclaimer, the term of this patent is extended or adjusted under 35 U.S.C. 154(b) by 103 days.

(21) Appl. No.: 18/628,491

(22) Filed: Apr. 5, 2024

(65) Prior Publication Data

US 2025/0318030 A1 Oct. 9, 2025

(51) Int. Cl.
*H05B 47/14* (2020.01)

(52) U.S. Cl.
CPC .................................... *H05B 47/14* (2020.01)

(58) Field of Classification Search
CPC ........ H05B 47/14; H05B 47/16; H05B 47/11; H05B 45/37
See application file for complete search history.

(56) References Cited

U.S. PATENT DOCUMENTS

| | | | | |
|---|---|---|---|---|
| 2015/0230308 | A1* | 8/2015 | Shin | H05B 45/395 315/201 |
| 2016/0234893 | A1* | 8/2016 | Nishizono | H05B 45/3725 |
| 2017/0127501 | A1* | 5/2017 | Isaacs | B25F 5/02 |
| 2017/0146256 | A1* | 5/2017 | Alexander | F24F 11/64 |
| 2021/0352791 | A1* | 11/2021 | Tham | F21V 21/30 |
| 2023/0009890 | A1* | 1/2023 | Fowler | H05B 45/10 |

* cited by examiner

*Primary Examiner* — Abdullah A Riyami
*Assistant Examiner* — Syed M Kaiser
(74) *Attorney, Agent, or Firm* — Greenberg Traurig, LLP; Nicholas Martin; David J. Dykeman

(57) ABSTRACT

An electronic device controlling power provided from a power source to an electrical load is described. The electronic device includes dimmer circuitry converting an alternating current (AC) power signal from the power source into a load power signal for the lighting load, and feedback circuitry generating signaling for controlling a switching timing of the dimmer circuitry. The electronic device generates feedback signaling for controlling an amount of power provided from an AC power source to an electrical load by turning on dimmer circuitry and generating a load power signal provided to a load, generating a feedback signal for controlling any of a voltage value, a timing, and a rate of change of a voltage applied to a gate of a metal oxide semiconductor field effect transistor (MOSFET), and controlling a transition through a threshold voltage of the MOSFET gate according to the feedback signal.

17 Claims, 12 Drawing Sheets

APPARATUSES, SYSTEMS, AND METHODS FOR CONTROLLING ELECTRICAL POWER FOR LIGHTING LOADS

TECHNICAL FIELD

The present disclosure relates generally to electrical devices controlling power provided to electrical loads, such as electrical lighting loads. For example, the present disclosure relates to any of apparatuses, systems, and methods for electrical devices controlling electrical power provided to electrical loads consisting of and/or including light sources. Such electrical devices include light dimmers and/or lighting control devices, which may be, for example, included in and/or associated with communication networks, such as wired and/or wireless networks used for environmental control of indoor and/or outdoor spaces, including control of lighting and/or lighting sources.

BACKGROUND

Conventional light sources include dimming capabilities provided by conventional dimmer circuitry. An amount or level of dimming controlled by dimmer circuitry may be controlled and/or configured by any of a user input (direct, remote, physical, verbal, etc.), automation provided by local and/or remote processes, operations, elements, devices, programming, etc., and remote configuration provided via communication networks. Conventionally, dimming levels of various light sources throughout a house or an office building may be configured to be at various dimming levels according to any of time of day, day of week, season, outside temperature, location of light source, type of light bulb, etc. In such an example, the various dimming levels may be configured (e.g., using any of direct, indirect, and/or automatic command/configuration) by any of a local user, a remote user, a local network device, a remote network device, etc.

However, dimming circuitry operations vary according to types of light source (i.e., as included in a lighting load), such light source types including, but not limited to, fluorescent bulbs, compact fluorescent bulbs, halogen bulbs, and LED bulbs, MLV bulbs, etc. Further, use of conventional dimmers (e.g., often) results in unwanted effects in the light generated/emitted by lighting load, for example, as produced by varying types of light sources and/or current load conditions. For example, a conventional dimmer that dims (e.g., regulates, controls, etc.) power for a variety of types of lighting loads may provide a (e.g., relatively) noisy power signal to certain types lighting loads, for example, due to dimming circuitry components and/or configuration having noise producing characteristics. Such conventional noisy power signal of conventional dimmers may reduce the lifespan of the bulbs, for example, because of the added wear and tear on the bulb's lighting elements resulting from the noisy power signal. That is, in a case of a conventional dimmer performing any of forward and/or reverse phase control dimming on an AC power source signal, conventional switching elements, such as transistor circuitry (e.g., a conventional field effect transistor), may introduce signal noise when switching ON/OFF the power signal provided (e.g., output) to the load during a cycling of the AC power source signal (e.g., during AC mains cycling of public power utility). Such power signal noise generates and/or results in unwanted effects, such as any of a variance in brightness and/or intensity of the light, and/or an audible noise generated by electrical components of the lighting load physically vibrating.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

According to embodiments, an electronic device for controlling power flowing from a power source to a lighting load may include dimmer circuitry converting an alternating current (AC) power signal provided by the power source into a load power signal consumed by the lighting load, and feedback circuitry generating a feedback signal for controlling a switching timing used by the dimmer circuitry converting the AC power signal into the load power signal.

According to embodiments, a method for generating feedback signaling for controlling an amount of power provided from an alternating current (AC) power source to an electrical load may include any of the following: (1) turning on dimmer circuitry and generating a load power signal provided to a load; (2) generating a feedback signal for controlling any of a voltage value, a timing, and a rate of change of a voltage applied to a gate of a metal oxide semiconductor field effect transistor (MOSFET); and (3) controlling a transition through a threshold voltage of the MOSFET gate according to the feedback signal.

According to embodiments, dimmer circuitry controlling an alternating current (AC) power signal provided to an electrical load may perform any of the following: (1) converting, by the dimmer circuitry, the AC power signal into a load power signal consumed by the electrical load, and (2) providing a feedback signal, generated by feedback circuitry, for controlling a switching timing used by the dimmer circuitry converting the AC power signal into the load power signal.

According to embodiments, a feedback signal for controlling dimmer circuitry may reduce and/or mitigate unwanted effects of (e.g., resulting from) improper and/or inadequate control of electrical power provided to a light source by a transistor, such as a MOSFET. According to embodiments, a feedback signal may be used to improve control and/or operation of a MOSFET used in a dimmer, for example, to provide increased (e.g., better, improved, greater, more accurate, etc.) control of an output signal (e.g., a drain gate) of the MOSFET. According to embodiments, a feedback signal may be a signal generated based on (e.g., according to) a MOSFET output signal that is provided to a load. According to embodiments, the feedback signal may be applied to a gate of the MOSFET, and such feedback signal may be considered as or referred to as any of MOSFET gate feedback, gate control feedback, gate-drive feedback, etc. In such a case of using a MOSFET's output signal as a feedback signal for controlling a gate of the MOSFET, control of the MOSFET output signal may be improved, for example, by providing any of smooth (er) dimming, reducing signal noise, reducing audible noise, providing consistent brightness levels, reducing wear on, and/or increasing lifespan for, a load and/or the load's electronic and mechanical componentry, performing and/or providing load current monitoring (e.g., for anomalies), etc.

Figure 1:
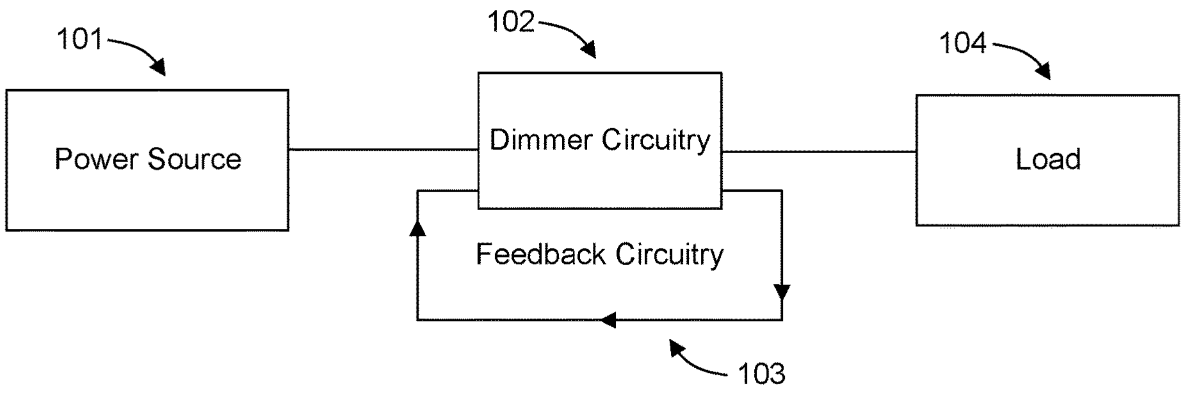
FIG. 1 is a diagram illustrating feedback signaling for dimmer operations, according to embodiments.
Figure 2:
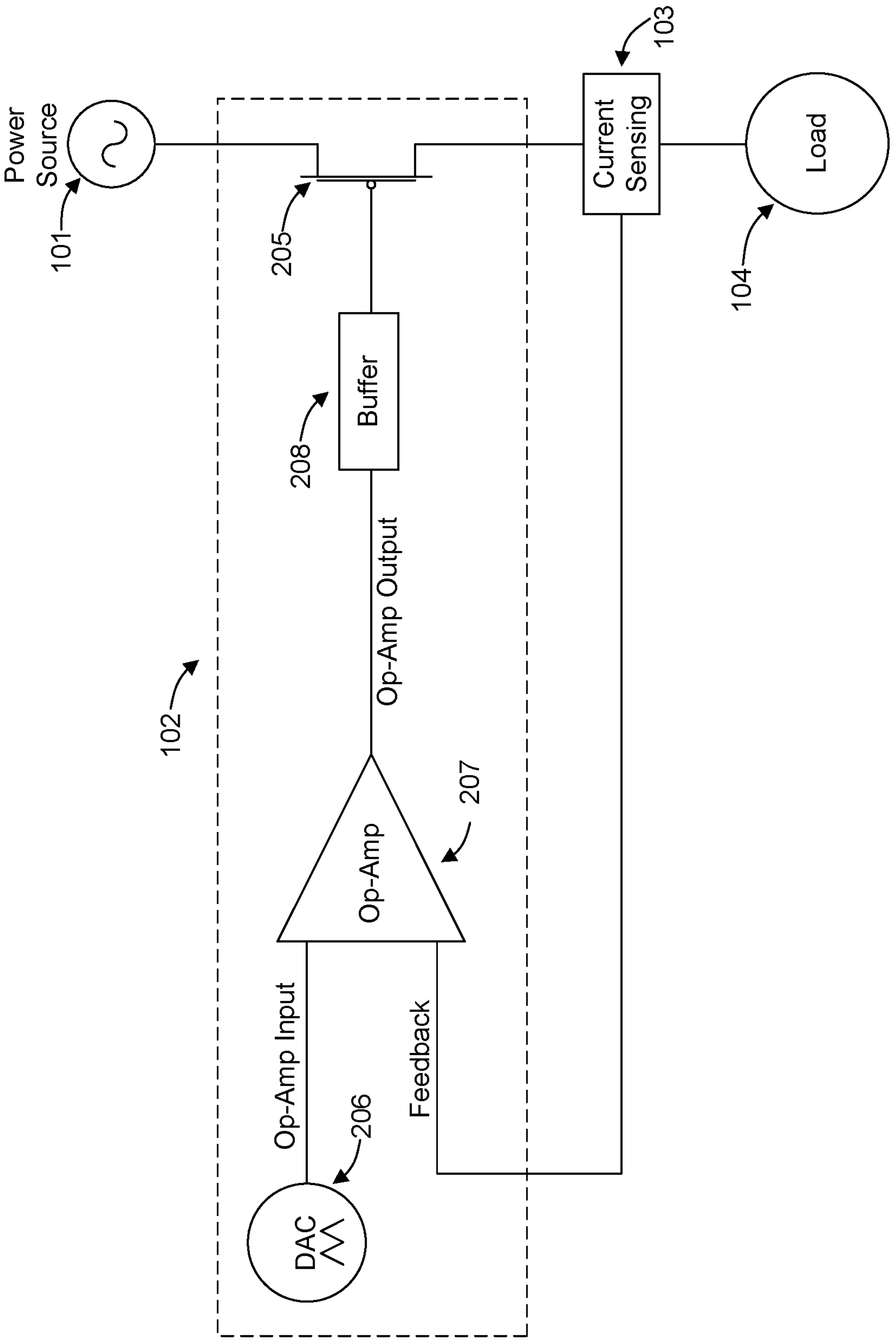
FIG. 2 is a diagram illustrating circuitry for closed-loop feedback signaling for dimer operations, according to embodiments.
Figure 3:
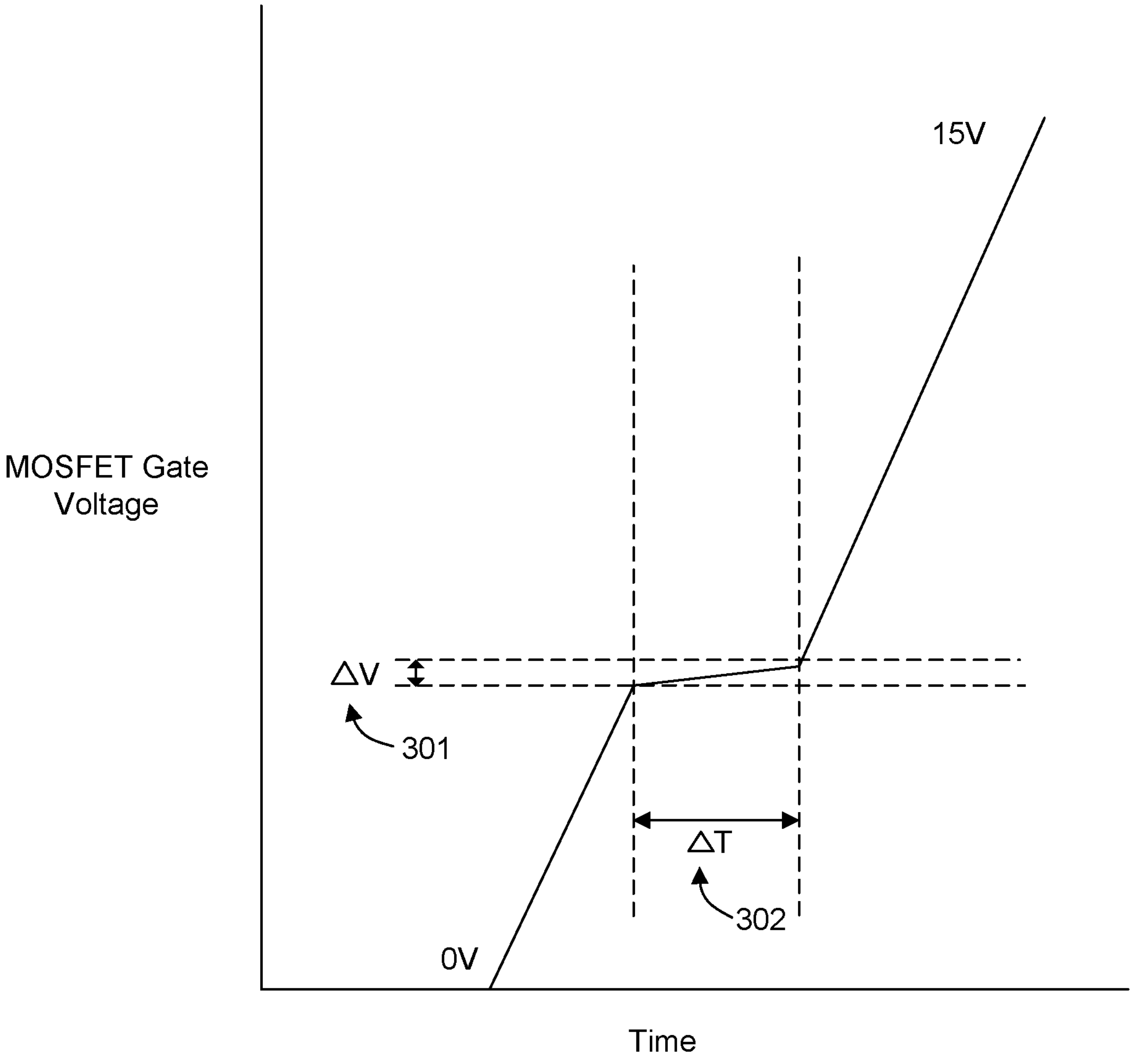
FIG. 3 is a diagram illustrating MOSFET gate voltage in view of closed-loop feedback signaling, according to embodiments.

FIG. 1 is a diagram illustrating feedback signaling for dimmer operations, according to embodiments. FIG. 2 is a diagram illustrating circuitry for closed-loop feedback signaling for dimer operations, according to embodiments. FIG. 3 is a diagram illustrating MOSFET gate voltage in view of closed-loop feedback signaling, according to embodiments.

Referring to FIG. 1, according to embodiments, dimmer circuitry 102, which may be interchangeably referred to as dimmer control circuitry 102, may control an amount of power supplied from power source 101 to load 104. According to embodiments, dimmer control circuitry 102 may use feedback signaling for controlling an amount of power supplied from the power source 101 to the load 104. According to embodiments, a feedback signal may provide (e.g., may indicate) information regarding the load 104. According to embodiments, feedback circuitry 103 may provide (e.g., convey, carry, etc.) the feedback signal. According to embodiments, dimmer control circuitry 102 may include (e.g., may be fabricated with, embodied with, indistinguishable from, etc.) feedback circuitry 103.

According to embodiments, power source 101 and dimmer control circuitry 102 may be combined and may be considered as the same unit, device, etc. According to embodiments, dimmer control circuitry 102 may be included in a variety of environments employing a plurality of networks, including wired and/or wireless communications networks for indoor and/or outdoor spaces that include a load 104 having light sources. According to embodiments, a feedback signal of feedback circuitry 103 may provide any of dynamic, local, immediate, unmediated, active, etc., control of an amount of power provided to load 104. According to embodiments, feedback signal 103 may provide control of an amount of power provided to load 104 that is independent of power control (e.g., ramp-up rate, etc.) provided by power source 101. According to embodiments, feedback signal 103 may provide control of an amount of power provided to load 104 according to light source types included in the load 104.

According to embodiments, feedback circuitry 103 may be used to control a rate of change of a voltage applied to a gate of transistor circuitry (e.g., a MOSFET) of dimmer circuitry 102. For example, a feedback signal provided via feedback circuitry 103 may be used to slow down the rate of increase (e.g., ramp-up) of the voltage (e.g., a voltage signal) applied to a gate of a MOSFET. According to embodiments, in such a case of slowing down the ramp-up of the voltage signal applied to the gate of the MOSFET (e.g., gate voltage signal), an amount of time for transitioning the voltage signal (e.g., fully) through a threshold voltage of the gate may be increased. That is, according to embodiments, a feedback signal may be used for increasing time for transitioning a MOSFET through its gate threshold voltage. According to embodiments, in a case of a feedback signal for controlling the voltage signal applied to the gate of the MOSFET, for example, such that the time for transitioning through a MOSFET gate threshold voltage is increased, power signal noise (e.g., emissions noise caused by the transition) may be reduced.

According to embodiments, referring to FIG. 3, there may be a case of a feedback signal for controlling a voltage applied to a MOSFET gate terminal, for example, to increase a time, for example, $T_{transition}$ (ΔT) 302, for transitioning through a MOSFET gate threshold voltage, for example, $V_{threshold}$ (ΔV) 301, (e.g., for allowing full flow of electrical energy (power) from source to drain of the MOSFET). According to embodiments, in such case of increasing a time for transitioning through the MOSFET gate threshold voltage, signal noise (e.g., noise included in the power signal provided to the load) may be reduced. That is, in a case of increasing the ΔT 302 through the ΔV 301, there may be reduced signal noise because of reduced anomalies resulting from the control of the (e.g., slower) transition through the MOSFET gate threshold voltage. According to embodiments, controlling the transition through the MOSFET gate threshold voltage allows for improved performance and operation (e.g., less harsh, more smooth, more granular, more precise, more active, associated with and/or based on load characteristics, etc.) of dimmer circuitry and/or load circuitry.

Referring to FIG. 1 through FIG. 3, according to embodiments, electrical circuitry (e.g., circuit components) for closed-loop feedback signaling for (e.g., controlling, modifying, changing, slowing, increasing, etc.) dimmer operations and/or electrical characteristics (e.g., such as time, voltage, current, impedance, etc.) of dimmer operations may include and/or involve any of a power source 101, dimmer control circuitry 102, feedback circuitry 103, and a load 104. Further, referring to FIG. 1 and FIG. 2, the dimmer control circuitry 102 may include any of a field effect transistor (FET) 205, a digital to analog converter (DAC) 206, an operational-amplifier (op-amp) 207, a buffer 208, and feedback (e.g., current sensing) circuitry 103. According to embodiments, feedback circuitry 103 may be a sense resistor for sensing current flowing to the load 104. However, the disclosure is not limited there to, and feedback circuitry 103 may be any electrical element or circuitry performing (e.g., any of open-loop type, closed-loop type, and fluxgate type) current sensing, such as, for example, a transformer, a fluxgate device, a shunt resistor, a Hall effect sensor, a Rogowski coil, a magneto-resistive device, etc.

According to embodiments, the circuitry of FIG. 2 may allow for controlling a slope of a voltage gain of a signal controlling an amount of current provided for an AC load that is being dimmed (e.g., undergoing dimming, subject to dimming operations, etc.). According to embodiments, an op-amp 207 may be used to control a gain of a voltage signal provided by DAC 206 for applying (e.g., supplying) to a gate of FET 205. In a case of controlling the gain of the voltage signal (e.g., a MOSFET gate voltage signal) applied to the gate of the FET 205, the op-amp 207 may be used to control (e.g., modify, attenuate, etc.) a slope of the gain of the voltage signal according to feedback provided by the feedback circuitry 103 (e.g., a sense resistor), for example, to control (e.g., reduce, increase) an amount of dimming applied to the load 104.

That is, according to embodiments, direct control of the FET 205 may be provided by (e.g., performed by) the circuitry of FIG. 2, for example, which may be used to control the ON/OFF timing of FET 205 using the op-amp 207. That is, according to embodiments, feeding back (e.g., a portion of) the load current (e.g., using a current sensor, a sensing resistor, etc.) along with a direct slope controlled input signal provided by DAC 206 provides closed-loop control of the FET 205. For example, in a case of providing dimming at a level of 25% of a load's full power, the direct slope controlled input signal provided by DAC 206 may be modified using the op-amp 207 for controlling ON/OFF timing of FET 205, thus controlling the power signal provided to the load 104 at the level of 25% of the load's full power. According to embodiments, circuitry, for example, as shown in any of FIG. 1 and FIG. 2, may operate in the below described manner for providing feedback signaling for controlling dimmer operations according to closed loop (e.g., feedback driven) control of a FET.

According to embodiments, DAC 206 may generate a dynamically controlled slope signal (e.g., the DAC 206 dynamically controls a voltage slope of a voltage level signal), and may provide such signal (e.g., as an input) to the op-amp 207. According to embodiments, op-amp 207 may provide closed-loop control of a FET 205, for example, according to an output signal associated with (e.g., generated based on input signals for) both the dynamically controlled MOSFET gate voltage control signal (e.g., as provided by DAC 206) and a feedback signal (e.g., indicating information regarding a load 104). According to embodiments, a FET 205, for example, subject to closed-loop control by the op-amp 207, may be used to control a flow of electrical energy, for example, from an AC power source signal 101 to a load 104. According to embodiments, current sensor (e.g., feedback circuitry 103) may receive a flow of electrical energy (e.g., as controlled by FET 205) that may be a feedback signal for closed-loop control of the FET 205. That is, according to embodiments, an amount of electrical power (e.g., flow of electrical energy) provided to a load 104 may be subject to closed-loop control by applying a feedback signal (e.g., current sensor output), for example, conveying information regarding the flow of electrical energy from the source 101 to the load 104, to circuitry (e.g., dimmer circuitry 102) controlling the amount of electrical power provided to the load.

According to embodiments, closed loop control of an amount of electrical energy flowing from an AC power source to a load may be provided by any of the following elements, which may be connected as described herein or in any other similar and/or suitable manner allowing for the features, characteristics, and/or operations described with respect to the following elements. According to embodiments, as a first element, there may be a signal controller (e.g., signal control element, op-amp, signal modifier, amplifier, attenuator, etc.) controlling a characteristic (e.g., voltage value, current, power/wattage, timing, rate of change, etc.) of a signal used for switching timing control of a switching element (e.g., a FET) for a source power signal (e.g., an AC power source signal). For example, according to embodiments described above, the signal control element may be an op-amp for closed loop control of the FET.

According to embodiments, in a case of a FET and any other similar and/or suitable switching element, such as a transistor, and IGBT, etc., the closed-loop control (e.g., provided by the dimmer circuitry and feedback circuitry) may be for (e.g., best suited to, limited to, most applicable to, etc.) controlling systems (e.g., systems of electrical circuitry and/or devices) having an analog turn on/off capability (e.g., nature, process, operation, etc.). According to embodiments, as a second element, there may be a signal generator (e.g., signal generating element, timing circuitry, DAC, R/C timing circuit, etc.) outputting a control (led) slope signal that is provided to a signal controller. For example, according to embodiments described above, the signal generating element may be a DAC in a case of providing (e.g., generating) a dynamically controlled slope (e.g., of the DAC output signal), and may be a R/C timing circuit to generate a fixed control slope, (e.g., of the R/C timing circuit output signal).

According to embodiments, as a third element, there may be a power control element for controlling the flow of electrical energy/power from an AC power source to a load. For example, according to embodiments described herein, the power control element may be any number of FETs or other similar transistors. According to embodiments, as a fourth element, there may be a load receiving electrical power from the power source. According to embodiments, the load (e.g., in relation to the power source) may considered as including a sensing element (e.g., a current sensing resistor) providing a closed-loop feedback loop (e.g., closed-loop feedback information) to the op-amp, for example, to close the control loop for the FET.

According to embodiments, the circuitry discussed above may provide load current monitoring, for example, for monitoring for load current anomalies. That is, according to embodiments, a load current may be monitored for anomalies, and for example, any number of actions, operations, adjustments, etc., may be performed according to the monitoring and/or information associated with the monitoring. According to embodiments, results of (e.g., information determined according to) such load current monitoring may be used for tuning the control slope, for example, to eliminate anomalies detected by and/or according to the load current monitoring. That is, according to embodiments, in a case of anomalies associated with and/or generating EMI, embodiments described herein may provide any of control, reduction, and elimination of such EMI generation in electrical circuits, such as those providing control of power provided to a load (e.g., a load on the electrical circuits).

Figure 4:
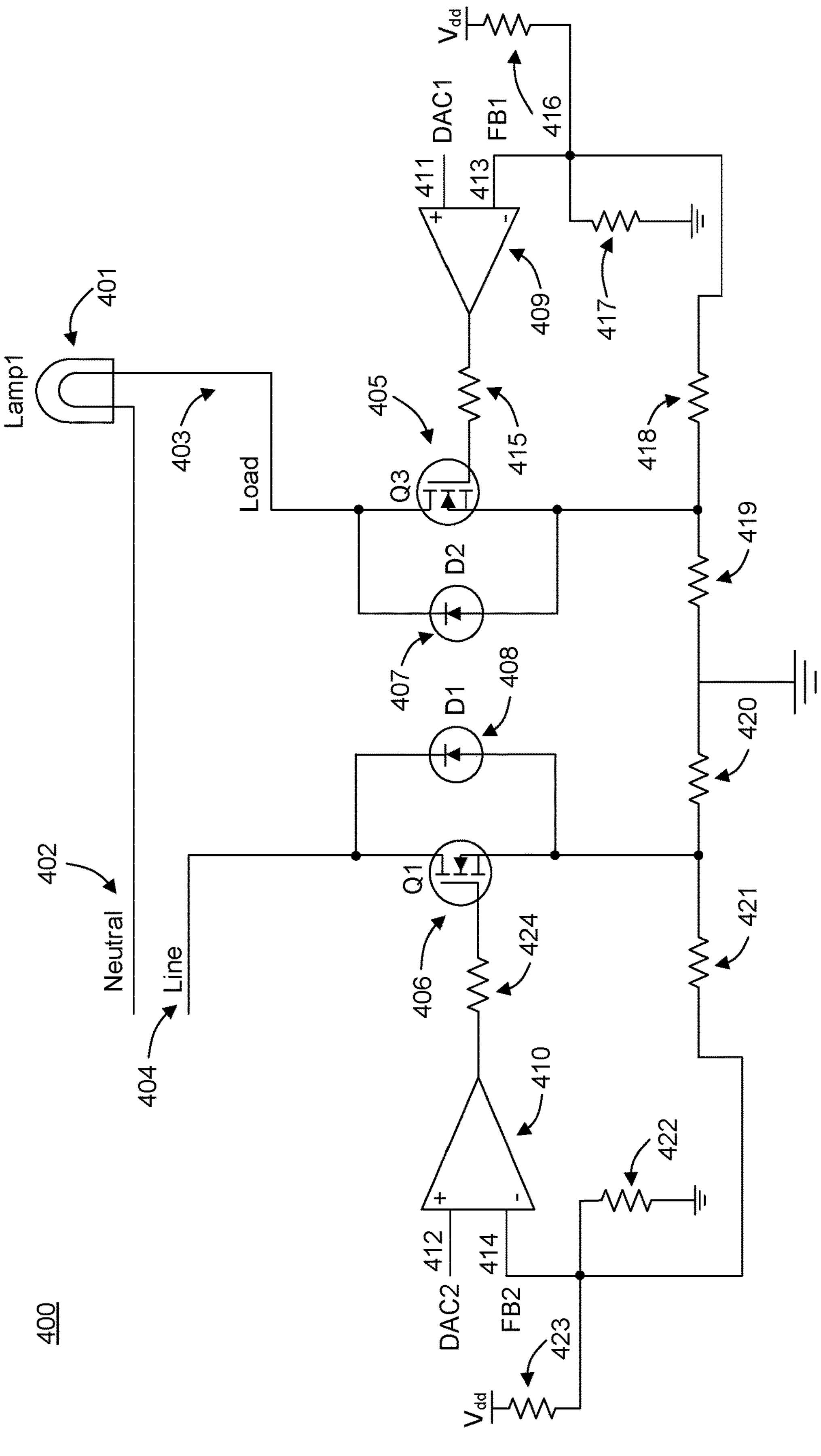
FIG. 4 is a diagram illustrating dimmer circuitry including at least a MOSFET and MOSFET feedback circuitry, according to embodiments.
Figure 5:
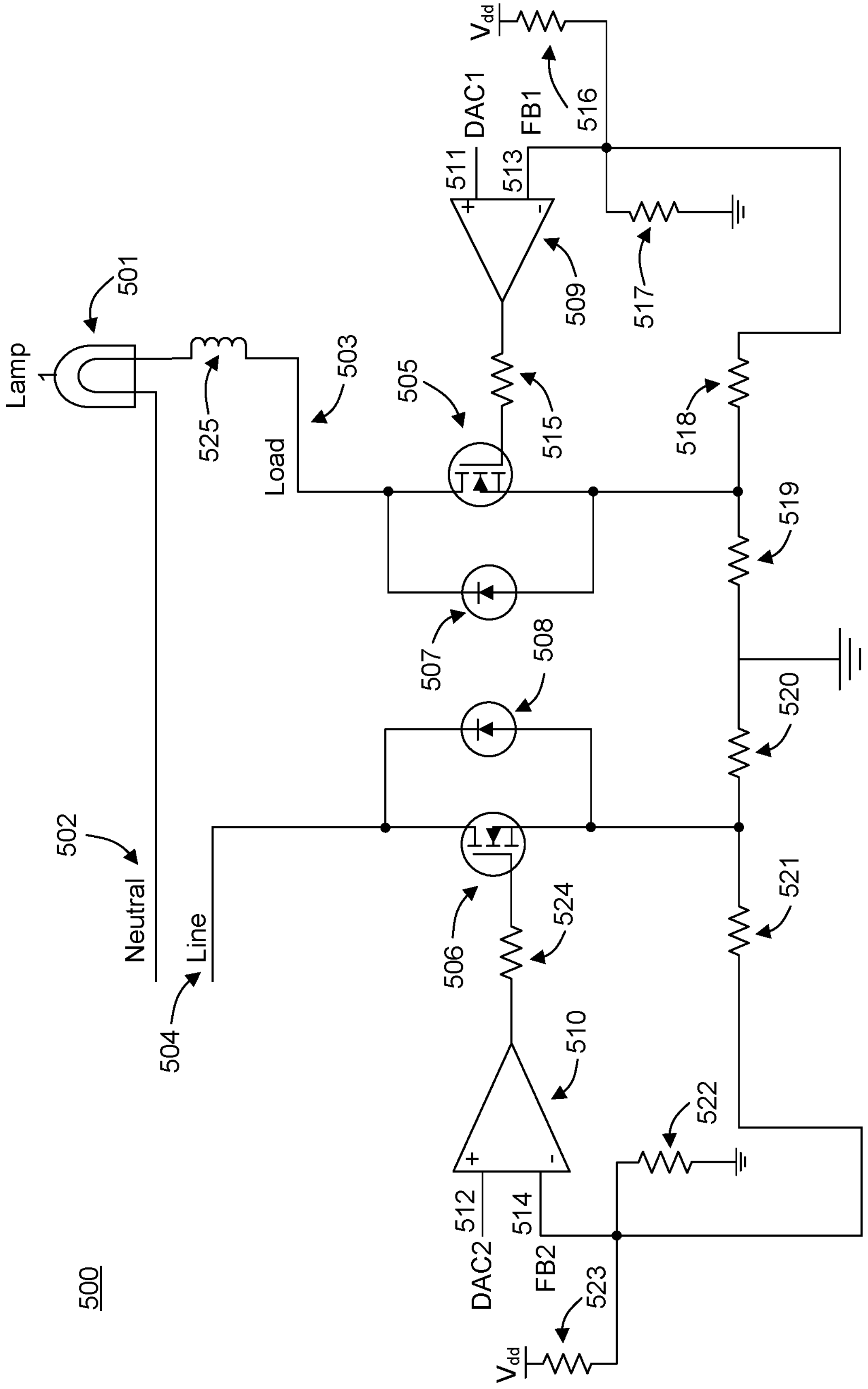
FIG. 5 is a diagram illustrating dimmer circuitry including a MOSFET, an inductor, and feedback circuitry, according to embodiments.

FIG. 4 is a diagram illustrating dimmer circuitry including a MOSFET and feedback circuitry, according to embodiments. FIG. 5 is a diagram illustrating dimmer circuitry including a MOSFET, an inductor, and feedback circuitry, according to embodiments.

According to embodiments, referring to FIG. 4 and FIG. 5, dimmer circuitry 400, 500 (e.g., for controlling power provided to a load) and feedback circuitry (e.g., for controlling power applied to a transistor gate) may be used for controlling an amount of power provided to a lighting load (e.g., any other similar load using such dimmer and feedback circuitry of FIG. 4 and FIG. 5). According to embodiments, referring to FIG. 4 and FIG. 5, dimmer circuitry 400, 500 may include common electrical circuitry and/or componentry, such as, but not limited to, any of amplifiers, hall effect sensor, operational amplifiers (op amps), resistors, transistors, diodes, triodes, triodes for AC (TRIACS), thyristors, rectifiers, repeaters, field effect transistors (FETs), metal oxide semiconductor FETs (MOSFETs), optically coupled devices, phototransistors, photodiodes, light sensors, MOSFET gate drives, capacitors, inductors, transducer, switches, fuse, lamps, antennas, interfaces (e.g., hardware and/or software), wiring, wiring junctions, wiring and/or component coupling and/or connection, power sources (e.g., AC, DC, mains, etc.), power source coupling, load coupling and/or connection, ground coupling and/or connection, etc.

According to embodiments, referring to FIG. 4 and/or FIG. 5, a transistor (e.g., a MOSFET) may be driven (e.g., operated, controlled, switched, activated, etc.) according to feedback conveying information regarding power conveyed to the load. According to embodiments, a (e.g., new, non-conventional) electronic device may be a feedback-driven dimmer including circuitry for feedback (e.g., for feeding back information, such as data, values, electrical measurements, samples, etc.) for controlling a gate voltage of a transistor. According to embodiments, feedback for controlling a gate voltage of a MOSFET may provide control of characteristics of the power signal provided to a lighting load. According to embodiments, any of any of hall effect sensors, transformers, inductive coupling, communicative coupling, and any other similar and/or suitable circuitry may be used for providing a feedback signal for controlling a gate drive (e.g., for driving a gate, for controlling a gate voltage, etc.) of a MOSFET.

Referring to FIG. 4, a load 401 (e.g., a lighting load, a lamp, etc.) may be connected to a neutral line 402 (e.g., connected to neutral/ground) and a load line 403 (e.g., providing power to the load 401). The load line 403 may be connected to phase control circuitry, such as but not limited to: MOSFET 405, MOSFET 406, diode 407, diode 408, amplifier 409, amplifier 410, and resistor 415 through resistor 424. According to embodiments, first input control signal 411 (e.g., digital-to-analog converter 1 (DAC1) input) and second input control signal 412 (e.g., DAC2 input) and first (e.g., negative cycle) feedback signal 413 and second (e.g., positive cycle) feedback signal 414 may be provided to respective amplifiers 409, 410 providing input control signals to/at respective gates of MOSFETs 405, 406. According to embodiments, first and second input control signals 411, 413, may be provided by any of a microcontroller (e.g., a DAC, a processor, a controller, etc.) and/or any other suitable/similar signal source. According to embodiments, the control signal may move from a low voltage to a high voltage in some form of linear, exponential, or stepwise function over any suitable time range, such as, for example, time ranges including several microseconds and/or several hundred microseconds.

FIG. 5 is a diagram illustrating dimmer circuitry including a MOSFET, an inductor, and feedback circuitry, according to embodiments.

Referring to FIG. 5, according to embodiments, dimmer circuitry 500 may be connected to a load 501 that is connected to a neutral line 502 and a load line 503. According to embodiments, dimmer circuitry 500 may include and/or be connected to a power line 504 (e.g., providing power to the load 501). The power line 504 may be connected to circuitry providing phase control. According to embodiments, such phase control circuitry may include any of: MOSFET 505, MOSFET 506, diode 507, diode 508, amplifier 509, amplifier 510, and resistors 515 through 524. Further, according to embodiments, an inductor 525 may be (e.g., optionally) disposed between an output of MOSFET 505 and an input of the load 501, for example, to provide filtering of the power provided to the load 501. According to embodiments, first input control signal 511 (e.g., provided by a first digital-to-analog converter (DAC1)) and second input control signal 512 (e.g., provided by a second DAC (DAC2)) may be respectively provided to amplifier 509 and amplifier 510. According to embodiments, a first feedback signal 513 for providing feedback during a negative cycle (e.g., of an AC signal) and second feedback signal 514 (e.g., positive cycle) may be respectively provided to amplifier 509 and amplifier 510. According to embodiments, amplifier 509 and amplifier 510 respectively provide input control signals for a gate of MOSFET 505 and a gate of MOSFET 506. According to embodiments, first and second input control signals 511, 512, may be provided by any of a microcontroller (e.g., a DAC, a processor, a controller, etc.) and/or any other suitable/similar signal source, and the control signal may move from a low voltage to a high voltage in some form of linear, exponential, or stepwise function over any suitable time range, such as, for example, time ranges including several microseconds and/or several hundred microseconds.

According to embodiments, the circuitry illustrated in any of FIG. 4 and FIG. 5 discussed above, and FIG. 6 and FIG. 7 discussed hereinbelow, may operate in a manner as discussed herein. According to embodiments, the following discussion of dimmer operations for an AC power signal considers one half of the dimmer and feedback circuitry (e.g., as shown in any of FIG. 4 through FIG. 7) for discussing feedback signaling for a negative-half wave of an AC power signal (e.g., AC mains cycle) between power line 404 and neutral line 402. According to embodiments, a MOSFET gate control signal may be provided via first input control line 411. That is, for example, a microcontroller (e.g., DAC1) may send a control signal to amplifier 409 on first input control line 411. According to embodiments, such control signal may move from a low voltage to a high voltage, for example, in any suitable form or manner over any suitable time range, such as some form of linear, exponential, or stepwise function (e.g., over a certain time range such as several microseconds to several hundred microseconds).

According to embodiments, there may be a resistor divider voltage, for example, as a result of resistors 417, 418, 421, and 422, (e.g., resistors coupled to FB1, which may be referred to as any of a resistor divider, a voltage divider, a voltage divider bridge, etc.). According to embodiments, the resistor divider may also include a capacitor, for example, to smooth out stepwise voltage transitions of DACs. According to embodiments, as the signal (e.g., a control signal from DAC1) provided via first input control line 411 rises above the resistor divider voltage (e.g., resistors 417, 418, 421, and 422, coupled to FB1) then an output of the amplifier 409 (e.g., through resistor 415) at the gate of MOSFET 405 may (e.g., also) rise. According to embodiments, in a case where: (1) a voltage for the control signal provided by DAC1 (e.g., on first input control line 411) continues to rise, and (2) a voltage at the gate of MOSFET 405 rises, a gate threshold voltage of the MOSFET 405 may be reached (e.g., may be approached, etc.). In such a case, the MOSFET 405 may (e.g., begin to) turn on, for example, providing power to the load 401.

According to embodiments, in such case (e.g., of rising voltages (1) and (2) noted above), a current path may flow through a source (e.g., source gate) to a drain (e.g., drain gate) of the MOSFET 405, and through resistor 418 causing a voltage increase. Further in such a case, the current path may flow through resistor 419 and diode 107, through to the load 401 (e.g., a light source) connected between load line 403 and neutral line 402. According to embodiments, in such case of increasing voltage across resistor 418, there may be a (e.g., resulting, caused, concurrent, etc.) increase in voltage FB1 (e.g., a voltage applied at negative terminal of amplifier 409), for example, which may approach the voltage applied on first input control line 411. That is, in the case of the voltage FB1 on first feedback line 412 approaching the voltage DAC1 on first input control line 411, then, according to embodiments, while the MOSFET 104 may attempt (e.g., begin, start, switch to, etc.) turning off, the MOSFET 104 may not turn off, for example, because the voltage of the DAC1 signal on first input control line 411 is also increasing. According to embodiments, in a case of feedback signaling, a ramping (e.g., a rate of ramp-up) of a voltage at a gate of a MOSFET may be controlled.

According to embodiments, in the case of respective voltages of the signals FB1 and DAC1 approaching (e.g., being near) each other, a rate of change (e.g., the delta value) of the gate voltage of the MOSFET 405 may be slowed down, thus, increasing the time it takes for the MOSFET 405 to transition (e.g., fully) through the threshold voltage of the gate of the MOSFET 405. According to embodiments, increasing the time for transitioning (e.g., fully) through the threshold voltage may (e.g., help, further, etc.) reduce emissions noise caused by such transition. According to embodiments, resistors included (e.g., disposed) in this circuit are set so that when (e.g., once) the MOSFET is (e.g., fully) on, an effect of respective voltage dividers FB1, FB2 (e.g., resistors 417 and 418, 421 and 422) on respective voltage drops through resistor 419, 420 is minimal. In other words, according to embodiments, the voltage drop through resistor 418 has minimal effect (e.g., minimal impact) on the voltage divider FB1, and thus is not (e.g., no longer) in a range that prevents (e.g., affects) the DAC1 signal from keeping the MOSFET turned on. According to embodiments, as the DAC1 voltage rises, the gate voltage of the MOSFET 405 rises to the full level allowed by the connected amplifier 409. According to embodiments, referring to FIG. 4, a DAC1 voltage level may be dropped to OV, for example, to turn off the MOSFETs 405, 406.

Embodiments discussed herein, for ease of reference, may refer to (e.g., only) one half of a dimmer circuit with respect to operation during a negative half wave AC mains cycle, for example, referring to FIG. 4, between power line 404 and neutral line 402. According to embodiments, in a case of a positive half wave cycle, the process is similarly repeated using the DAC2 signal and components of respective (e.g., left-hand) sides of FIG. 4, FIG. 5, and FIG. 7. That is, according to embodiments, each half wave cycle may cause the alternating sides of a circuit to become active as phase cut dimming proceeds. For example, referring to FIG. 4, in a case of a negative half wave AC mains cycle between power line 404 and neutral line 402, circuit elements including amplifier 409, MOSFET 405, diode 407, and resistors 415, 416, 417, 418, and 419 may be used. Further, according to embodiments, in a case of a positive half wave AC mains cycle between power line 404 and neutral line 402, circuit elements including amplifier 410, MOSFET 406, diode 408, and resistors 420, 421, 422, 423, and 424 may be used. According to embodiments, in a case of a full AC waveform/signal, the negative half of the feedback waveform signal may be inverted to properly drive feedback (e.g., as a negative voltage signal) into the input of the op-amp.

Figure 6:
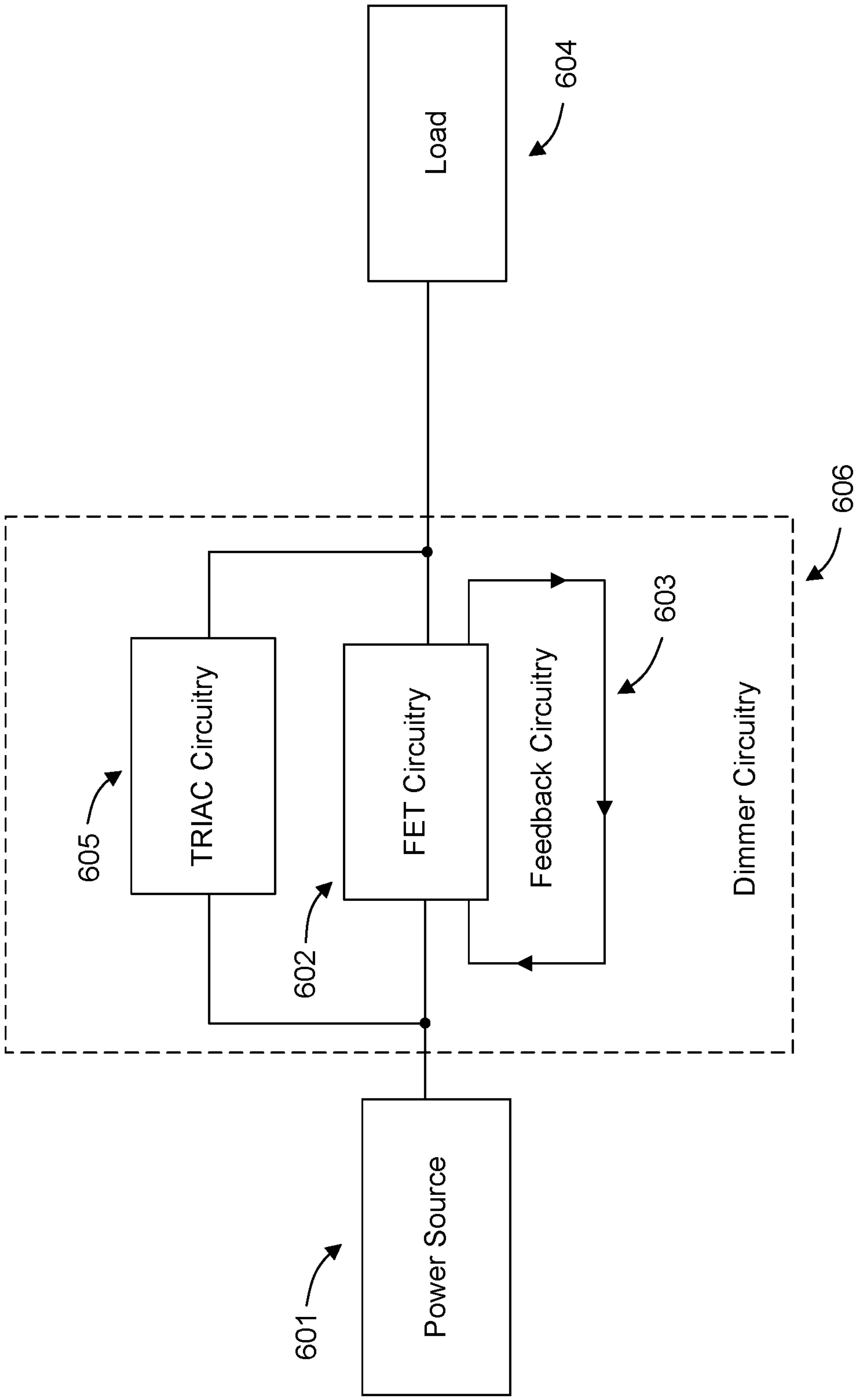
FIG. 6 is a diagram illustrating feedback signaling for dimmer operations and TRIAC operations, according to embodiments.
Figure 7:
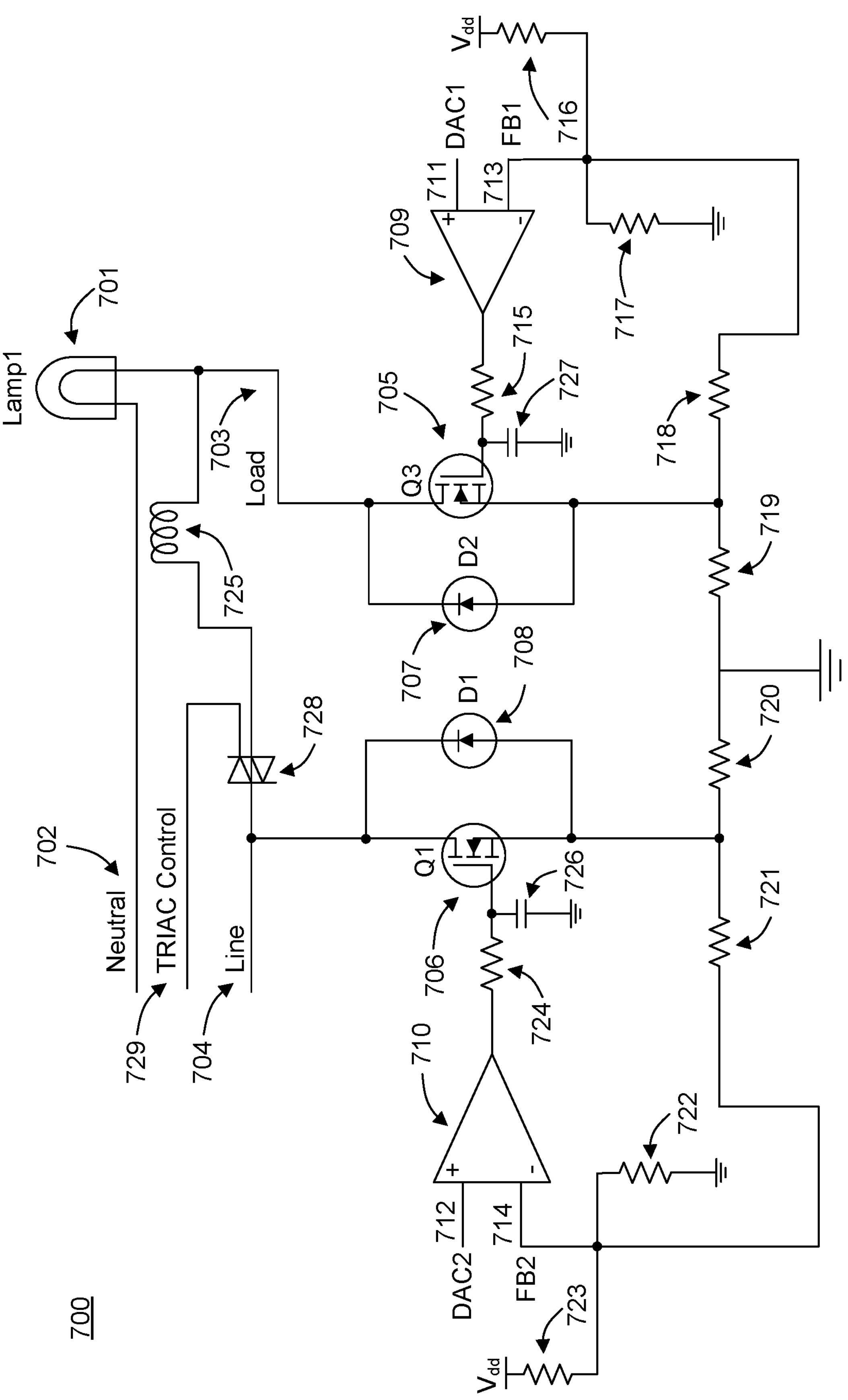
FIG. 7 is a diagram illustrating dimmer circuitry including a TRIAC, according to embodiments.

FIG. 6 is a diagram illustrating feedback signaling for operations (e.g., jointly) including device dimmer operations and triode for alternating current (TRIAC) operations, according to embodiments. FIG. 7 is a diagram illustrating dimmer circuitry including a TRIAC, according to embodiments.

Referring to FIG. 6, according to embodiments, feedback signaling for joint dimmer and TRIAC operations may be similar to feedback signaling for dimmer operations as described above, for example, regarding any of embodiments discussed above. According to embodiments, joint dimmer operations may include TRIAC operations performed in conjunction with dimmer operations. Accordingly, any of power source 601, dimmer circuitry 602, feedback circuitry 603, and load 604, may operate in a manner similar to as described above (e.g., regarding dimmer operations and features described referring to FIG. 1 to FIG. 5). According to embodiments, TRIAC circuitry 605 may operate in a manner as described below, for example, for (e.g., further, also, alternatively, etc.) controlling an amount of power provided to a lighting load, or any other similar/suitable load, for example, along with (e.g., as an alternative to, in conjunction with, in sync with, etc.) using dimmer circuitry 602 and feedback circuitry 603.

According to embodiments, for example, referring to FIG. 6 and FIG. 7, feedback circuitry (e.g., a current sensor, a Hall effect sensor, a resistor divider, etc.) such as feedback circuitry 603 may be implemented as resistors in the form of a resistor divider, such resistors 716, 717, 718, and 719. However, the present disclosure is not limited thereto. That is, according to embodiments discussed herein, feedback circuitry may be a current sensor, such as a Hall-effect sensor, or any other similar and/or suitable current sensing device or electrical circuitry component or element. According to embodiments, for example referring to FIG. 6, feedback circuitry 603 may be a current sensing device and/or element disposed for sensing a current flowing from the FET circuitry 602 to the load 604. Further, according to embodiment, the feedback circuitry may provide information (e.g., indicated as any of a voltage, a voltage level, etc.) regarding the current sensed by the feedback circuitry 603 to the FET circuitry 602, as discussed hereinbelow.

According to embodiments, for example, referring to FIG. 6 and FIG. 7, a triode for alternating current (TRIAC) (e.g., TRIAC circuitry) may be disposed in (e.g., may have) a parallel connection with a dimmer (e.g., dimer circuitry, a dimmer switch, etc.) between a power source and a load, for example, for controlling, converting, switching, etc., power to the connected load. As referred to herein, a TRIAC may be interchangeably referred to as and/or considered to be (e.g., the same as, similar to, used similarly to, etc.) any of a thyristor, a silicon controlled rectifier (SCR), a bidirectional triode thyristor, bilateral triode thyristor, a pair of coupled bipolar junction transistors (BJTs), etc. According to embodiments, referring to FIG. 6, a TRIAC 605 may be disposed in and/or with circuitry 600 including dimmer circuitry 603. According to embodiments, a TRIAC 605 may be connected in parallel to dimmer circuitry 600 for providing and/or controlling power for a load 601 that is connected to the dimmer circuitry 600.

According to embodiments, referring to FIG. 7, a TRIAC 728 may be disposed in and/or with circuitry 700 including any of items 701 through 725. According to embodiments, a TRIAC 728 may be connected between a power input line (e.g., line level input line) 704 and a load line 703 of the circuitry 700. According to embodiments, an inductor 725 may be disposed in series between the TRIAC 728 and the load 701. According to embodiments, a TRIAC control line 729 (e.g., providing control signal for a TRIAC) may be connected to the TRIAC 728. The circuitry 700 may include dimmer circuitry including any of MOSFETs 705, 706, diodes 707, 708, amplifiers 709, 710 having respective input lines 711, 713 and 712, 714, resistor 715 through resistor 724, and capacitors 726, 727. According to embodiments, such dimmer circuitry may be used in a manner, for example, as described above with regard to dimmer circuitry of FIG. 4 and FIG. 5.

According to embodiments, in a case of a TRIAC (e.g., a thyristor) connected in parallel to a dimmer, there may be a method for using the TRIAC and dimmer circuitry for any of switching, controlling, dimming, etc., power to electrical loads, such as lighting loads. For example, such loads may be any of lightbulbs, light emitting diodes (LEDs), light emitting devices, display screens, sound emitting devices, speakers, fans, window shades/blinds, other HVAC devices, doors, gates, garage doors, sprinklers, and any other similar and/or suitable electronic/mechanical device or component that may be a load for dimming, power control, and/or switching circuitry. According to embodiments, a TRIAC connected in parallel to dimmer circuitry (e.g. for switching and/or dimming power provided to loads), may provide and/or perform any of the following.

According to embodiments, a method for providing power to a load, including, for example, a method for turning on a load using a TRIAC connected in parallel to a dimmer may include (e.g., first, initially, etc.) turning on (e.g., activating, triggering, engaging, controlling, enabling, etc.) a TRIAC and then turning on other circuitry, for example, such as feedback driven dimmer circuitry providing power to a load. According to embodiments, in a case of engaging (e.g., first switching on) a TRIAC before engaging (e.g., switching on) dimmer circuitry including associated feedback circuitry, the TRIAC may be turned on first for taking-on an initial current of the load (e.g., for first taking-on an inrush current that is supplied to a load).

According to embodiments, dimmer circuitry may be turned on after turning on the TRIAC, and the dimmer circuitry may take on (e.g., provide) the long-term (e.g., remaining, subsequent, etc.) current to any suitable type of electrical load, such as a large load (e.g., a high number) of lighting devices. According to embodiments, in such a case, the TRIAC (e.g., a drive voltage at a TRIAC gate) may be turned off, for example, after turning on the dimmer circuitry. According to embodiments, in such case where the TRIAC is turned off and the dimmer circuitry is turned on, the TRIAC may not (e.g., may no longer) dissipate heat. In such a case of lowered heat dissipation by the TRIAC, there may be no need for (e.g., certain, specific, other, etc.) elements for dissipating heat generated by the TRIAC, such as, for example, a (e.g., large) heatsink. According to embodiments, in a case of turning off a load (e.g., by not providing power to a load), wherein the dimmer circuitry is providing a current to the load, a TRIAC may be (e.g., first) turned on and then (e.g., subsequently) the dimmer circuitry may be turned off (e.g., by causing an open-circuit in the dimmer circuitry).

According to embodiments, a TRIAC connected in parallel to dimmer circuitry may provide dimming control of a load, such as for example, dimming control of one or more light sources that receive current/power from one or both of the TRIAC and the connected dimmer circuitry. According to embodiments, in a case of a TRIAC in combination with a dimmer providing dimming control, the combination may be used for more than (e.g., merely) switching on/off a current/power provided to a load. That is, according to embodiments, filters for (e.g., proximate to, connected to, surrounding, attached to etc.), and/or (e.g., appropriate) filtering for, the TRIAC may provide (e.g., enable, allow for, etc.) control of an amount of power (e.g., voltage, current, etc.) received by a load, for example, to allow and/or enable dimming control of a lighting load. According to embodiments, in a case of dimmer circuitry connected to a TRIAC having filtering (e.g., provided by adjoining, connected, adjacent, etc., electrical components such as resistors, capacitors, inductors, varistors, operational amplifiers, etc.), a current and/or power provided to a load may be controlled, for example, to (e.g., slowly) reduce dimming (e.g., by increasing power/current) from no current to full current. In a case where a TRIAC slowly transitions from a dimming state (e.g., dimming at 50% output) to a fully on state (e.g., no dimming of output) to allow for a full current to flow to a load, the dimmer circuitry may be turned on, allowing for the fully on TRIAC to be turned off.

According to embodiments, as discussed above, joint-device (e.g. including dimmer, dimmer circuitry, load dimming, etc.) operations may be performed by connecting (e.g., more than one) load current control devices (e.g., dimmer, triac, etc.) in parallel, for example, between a power source and a load. According to embodiments, a dimmer may include any number of FETs (e.g., for dimming) connected in parallel with a TRIAC (e.g., for load current control and/or dimming). According to embodiments, such dimmer in parallel with the TRIAC may provide joint device dimming operations on or for electrical energy flowing from the power source to the load. According to embodiments, joint-device phase cut dimming may be performed using FETs and a TRIAC connected in parallel between the power source and the load.

According to embodiments, such joint-device phase cut dimming may eliminate use of (e.g., a need for) a large choke (and/or inductor) connected in series with the TRIAC. That is, according to embodiments, such joint-device phase cut dimming may reduce a need for over-current protection for the output of the TRIAC, for example, because of over-current protection provided by the dimmer connected in parallel with the TRIAC. In such a case, there may be no need for a large choke and/or inductor connected in series with the TRIAC.

According to embodiments, such joint-device phase cut dimming may allow for a dimming device to be for (e.g., to provide, to perform, etc.) a variety of dimming types, for example, any dimming type of forward phase type, reverse phase type, or PWM type. That is, according to embodiments, such joint-device phase cut dimming may allow for the TRIAC to be used in a case of (e.g., the TRIAC may be used for) programmable load skew, for example, that provides any of forward phase dimming, reverse phase dimming, PWM dimming, or any other suitable and/or similar type of dimming. According to embodiments, such joint-device phase cut dimming may provide (e.g., allow for) a (e.g., single) dimming device controlling power supplied to a variety (e.g., broad range) of load types and load wattages.

Figure 8:
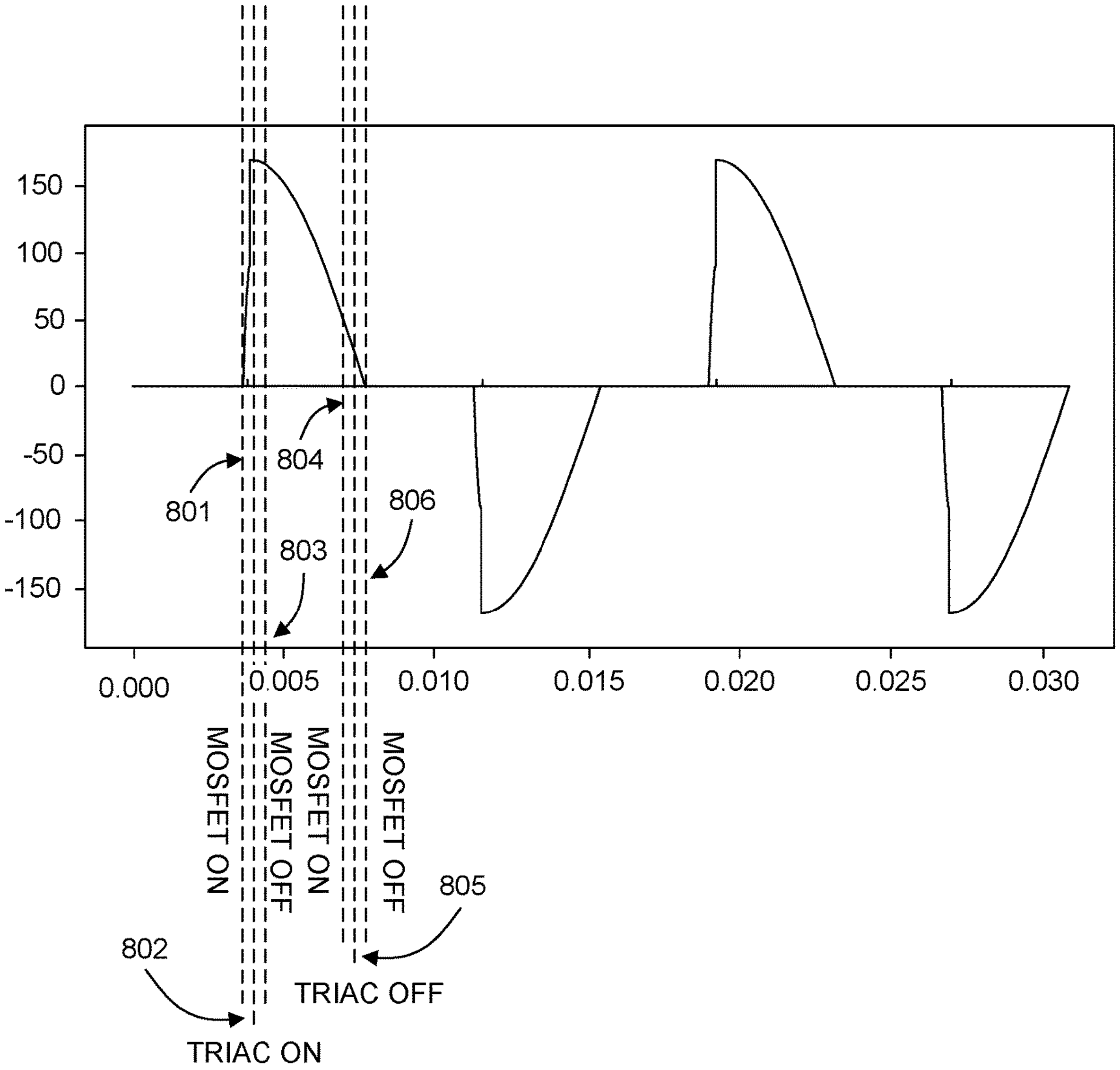
FIG. 8 is a diagram illustrating forward-phase (e.g., forward-phase control) dimming for LED loads, according to embodiments.

FIG. 8 is a diagram illustrating forward-phase dimming for incandescent loads, according to embodiments.

According to embodiments, in a case of phase dimming according to the circuitry of any of FIG. 6 and FIG. 7, forward phase (e.g., forward-phase control) dimming may be performed according to any of the following operations, for example, to generate a signal/waveform for incandescent loads as shown in FIG. 8. According to embodiments discussed herein, forward-phase control dimming may be performed for incandescent loads. However, according to embodiments, the disclosure is not limited thereto. That is, embodiments and features discussed herein, for example, forward-phase control dimming in combination with closed-loop feedback control, may be applied to any type of lighting load, for example, a load having (e.g., only) LED bulbs. According to embodiments, as a first operation 801, (e.g., partway through an AC waveform cycle) a MOSFET may turn on, for example, for providing a slower and/or lower-noise ramp up for power supplied from the power source to the load. According to embodiments, as a second operation 802, a TRIAC may be turned on (e.g., then, while the MOSFET is turned on), for example, allowing the TRIAC to take the power supplied from the power source and provide it to the load. According to embodiments, as a third operation 803, the MOSFET may be turned off (e.g., then, while the TRIAC is turned on), for example, allowing the TRIAC to provide full power (e.g., full electrical energy flow, all power or electrical energy needed, etc.) for the load. According to embodiments, as a fourth operation 804, as the AC power approaches zero cross, the MOSFET may turn on. According to embodiments, as a fifth operation 805, the TRIAC may turn off. According to embodiments, the TRIAC may turn off as the current through the TRIAC is lower than the TRIAC's hold current, for example, due to a small series inductor with some resistance. According to embodiments, as a sixth operation 806, the MOSFET may turn off at voltage zero cross, for example, which may be better for incandescent loads and/or LED loads.

Figure 9:
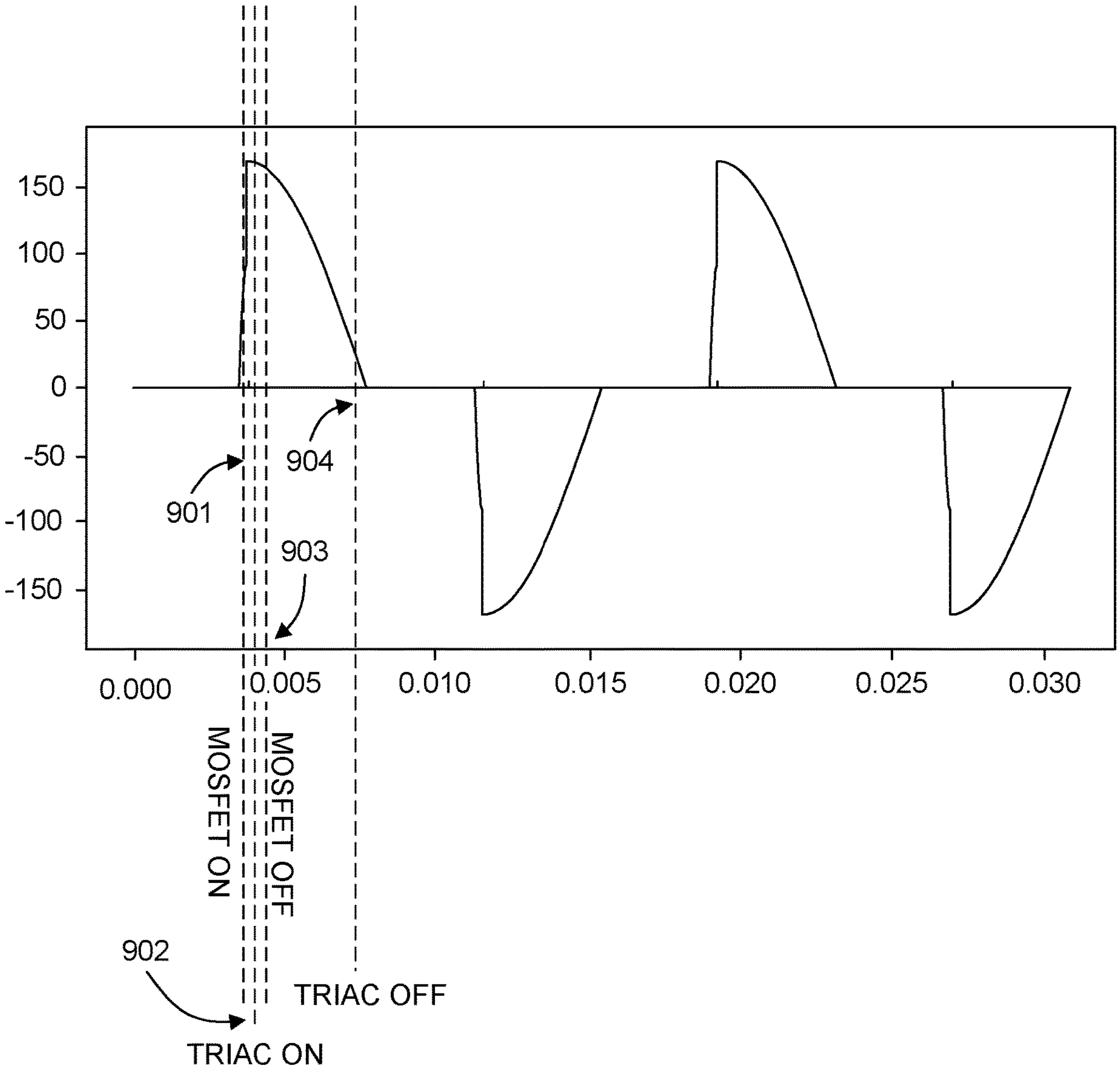
FIG. 9 is a diagram illustrating forward-phase (e.g., forward-phase control) dimming for magnetic and/or inductive loads, according to embodiments.

FIG. 9 is a diagram illustrating forward-phase dimming for magnetic and/or inductive loads, according to embodiments.

According to embodiments, in a case of phase dimming according to the circuitry of any of FIG. 6 and FIG. 7, forward phase dimming (e.g., forward-phase control) may be performed according to any of the following operations. That is, forward phase control dimming in combination with closed-loop feedback control as describe above, may be performed according to any of the following operations, for example, to generate a signal/waveform for any of magnetic loads and inductive loads, as shown in FIG. 9. According to embodiments, as a first operation 901, (e.g., partway through an AC waveform cycle) a MOSFET may turn on, for example, allowing for a (e.g., lower-noise, slower, etc.) ramp-up of a power supplied to a load. According to embodiments, as a second operation 902, a TRIAC may be (e.g., then) turned on, for example, allowing the TRIAC to take the current. According to embodiments, as a third operation 903, the MOSFET may be turned off (e.g., then, while the TRIAC is turned on), for example, allowing the TRIAC to take the full power used by (e.g., provided to) the load. According to embodiments, as a fourth operation 904, as the AC power approaches zero cross, the TRIAC may turn off, for example, in a case where the TRIAC shuts off when a current through (e.g., traversing, passing, etc.) the TRIAC's is (e.g., drops) below a hold current.

Figure 10:
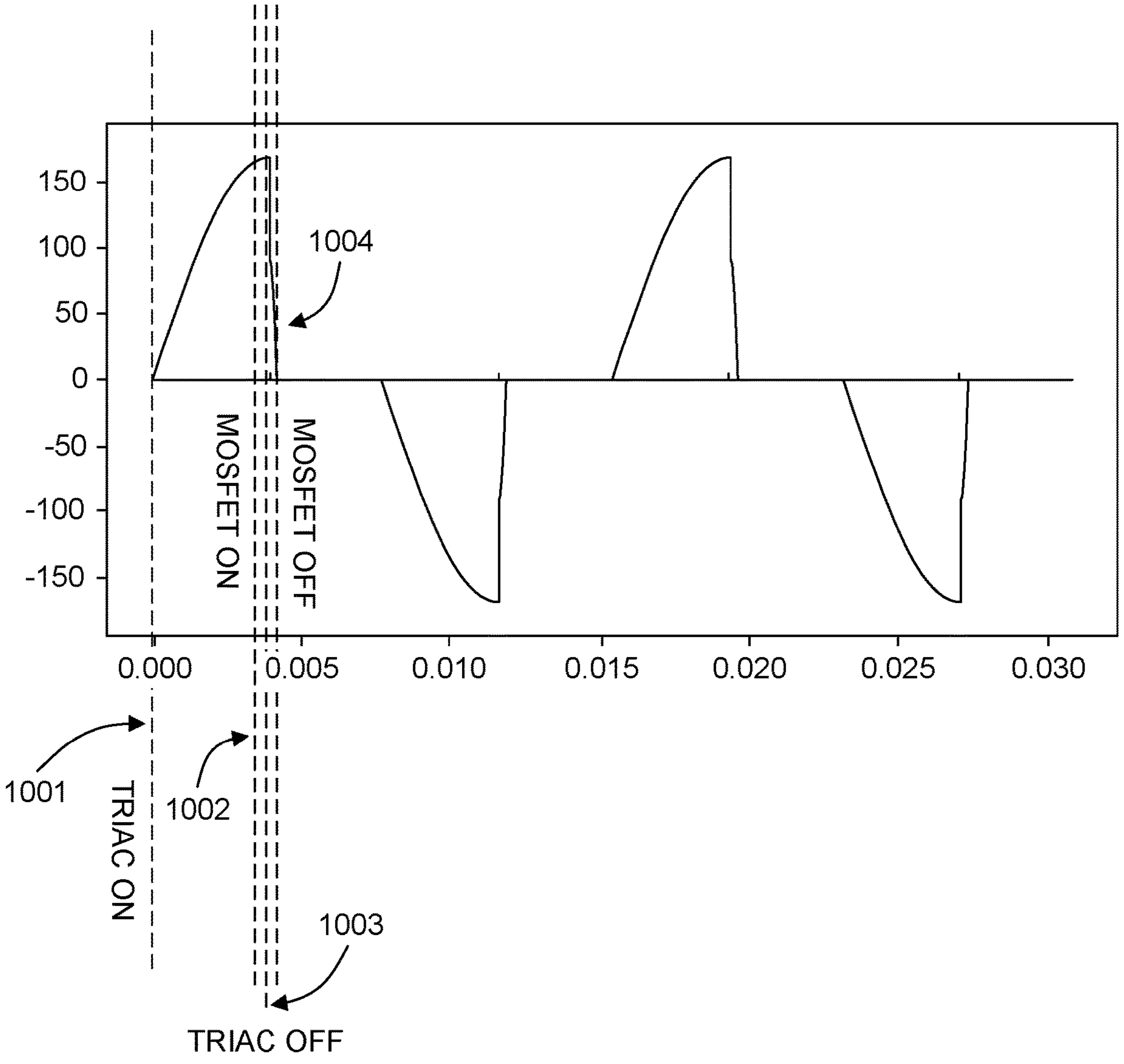
FIG. 10 is a diagram illustrating reverse-phase (e.g., reverse-phase control) dimming for LED loads, according to embodiments.

FIG. 10 is a diagram illustrating reverse-phase dimming for any of electronic, electronic low-voltage (ELV), and LED loads, according to embodiments.

According to embodiments, in a case of phase dimming according to the circuitry of any of FIG. 6 and FIG. 7, reverse phase (e.g., reverse-phase control) dimming may be performed according to any of the following operations. That is, reverse phase control dimming in combination with closed-loop feedback control as described herein, may be performed according to any of the following operations, for example, to generate a signal and/or waveform for loads, as shown in FIG. 10. According to embodiments, as a first operation 1001, a TRIAC may turn on, for example, at an AC zero cross of an AC waveform cycle of the power source's AC power signal. According to embodiments, as a second operation 1002, (e.g., after the start of the AC waveform cycle) the MOSFET may turn on. According to embodiments, as a third operation 1003, the TRIAC turns off, for example, when the current through the TRIAC is lower than its hold current (e.g., due to a small series inductor having (some) resistance). According to embodiments, as a fourth operation 1004, the MOSFET may turn off.

According to embodiments, in a case of a TRIAC being used for a part of the AC waveform cycle (e.g., only for in-rush current), there may be a reduction in an amount of heat generated during dimmer operations (e.g., generated by the TRIAC and dimmer circuitry). In such a case of reduced heat, components/parts that have lower temperature limits may be used, for example, in an electrical device described herein.

According to embodiments, a TRIAC connected (e.g., in parallel) to dimmer circuitry may provide circuit protection. That is, according to embodiments, in case of a short circuit detection, a TRIAC may turn OFF (e.g., may be turned OFF), for example, in a further case of detecting a short circuit when turning ON any of the dimmer circuitry and a load. That is, in a case having a TRIAC that is a silicon device, the TRIAC may be powered down (e.g., turned off) more quickly than dimmer circuitry, whereas dimmer circuitry may be slow to turn off in case of detecting a short circuit fault.

According to embodiments, in a case of phase dimming according to the circuitry of any of FIG. 6 and FIG. 7, any of IGBTs or DIACs may be used interchangeably with (e.g., in place of, as replacement for, etc.) any of MOSFETs and TRIACs. According to embodiments, in a case of circuitry according to the circuitry of any of FIG. 6 and FIG. 7, there may be reducing (e.g., reduction, mitigation, etc.) of noise (e.g., signal noise, EMI, etc.) in applications and/or operations (e.g., other than dimming) where MOSFETs are used, such as any of switching power supplies, AC dimming (e.g., intra-phase, using high speed switching and filtering similar to how audio is created, etc.

A thyristor, which may be interchangeably referred to as a TRIAC, may be used according to embodiments discussed herein, for example, and may be connected in parallel to dimmer circuitry. However, the present disclosure is not limited to a thyristor, a TRIAC, a SCR, etc., and any of a metal oxide semiconductor field effect transistor (MOSFET), an insulated-gate bipolar transistor (IGBT), a diode for alternating current (DIAC), or any other similar and/or suitable thyristor, transistor, diode(s), etc., may be used in place of and/or in combination with a TRIAC.

Figure 11:
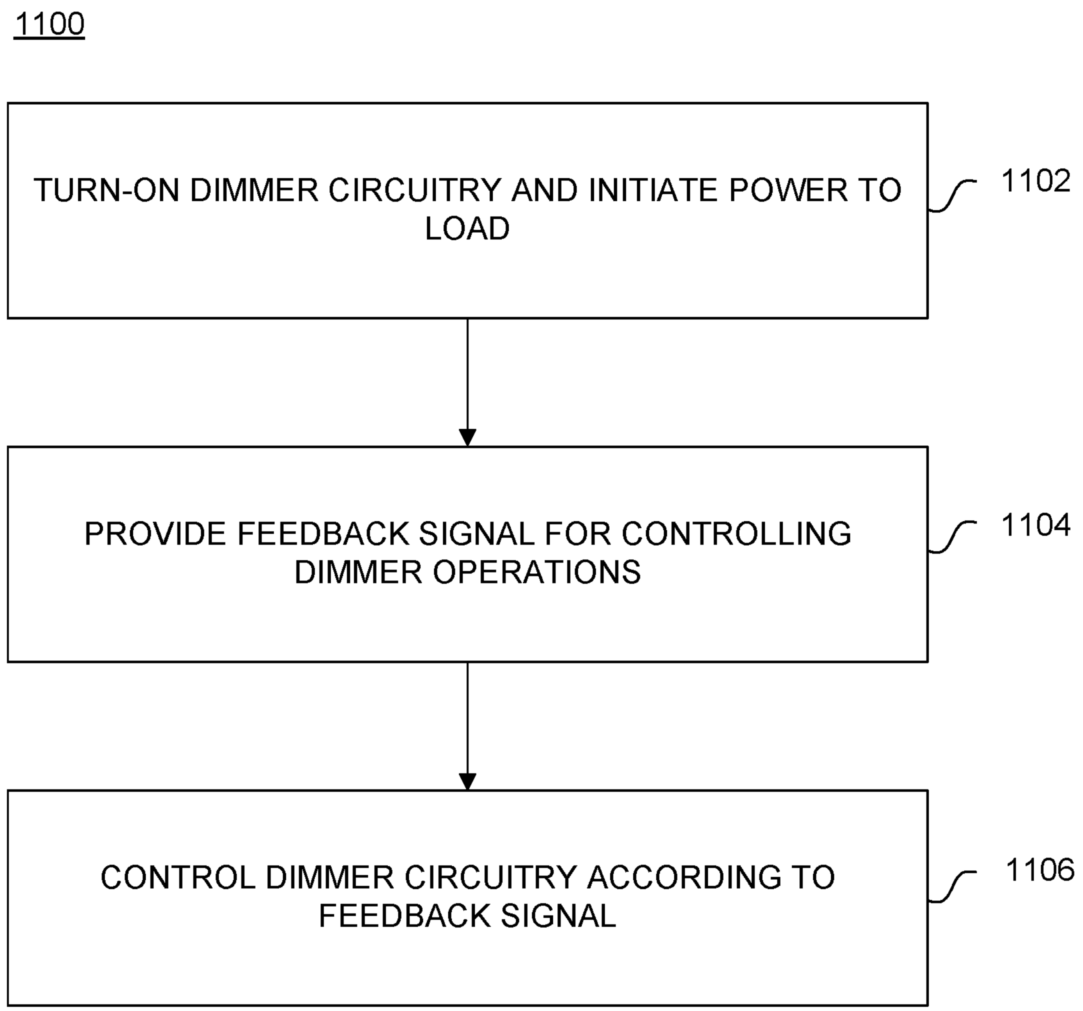
FIG. 11 is a diagram illustrating a method for feedback signaling controlling an amount of power provided from an AC power source to an electrical load, according to embodiments.

FIG. 11 is a diagram illustrating feedback signaling for controlling an amount of power provided from an AC power source to an electrical load, according to embodiments. According to embodiments, any of operations 1102, 1104, and 1106, may be for performing feedback signaling for dimmer operations discussed herein. According to embodiments, a first operation 1102 may be for turning on dimmer circuitry and initiating power provided to a load. According to embodiments, the first operation 1102 may include any of: (a) an AC power source providing an AC power signal; (2) an op-amp providing a MOSFET gate voltage control signal according to a time (e.g., and/or slope) control signal; and (3) the MOSFET providing power to a load. According to embodiments, a second operation 1104 may be for providing a feedback signal for controlling dimmer operations (e.g., by controlling a voltage value, a timing, a rate of change, etc., of the MOSFET gate voltage control signal). According to embodiments, the second operation 1104 may include feedback circuitry providing the op-amp a feedback signal regarding (e.g., associated with, indicating information about, etc.) the load. According to embodiments, a third operation 1106 may be for controlling dimmer circuitry according to the feedback signal. According to embodiments, the third operation 1106 may include controlling a time for transitioning through a threshold voltage of the MOSFET gate, for example, for controlling an amount of the power source's AC power signal provided to the load.

Figure 12:
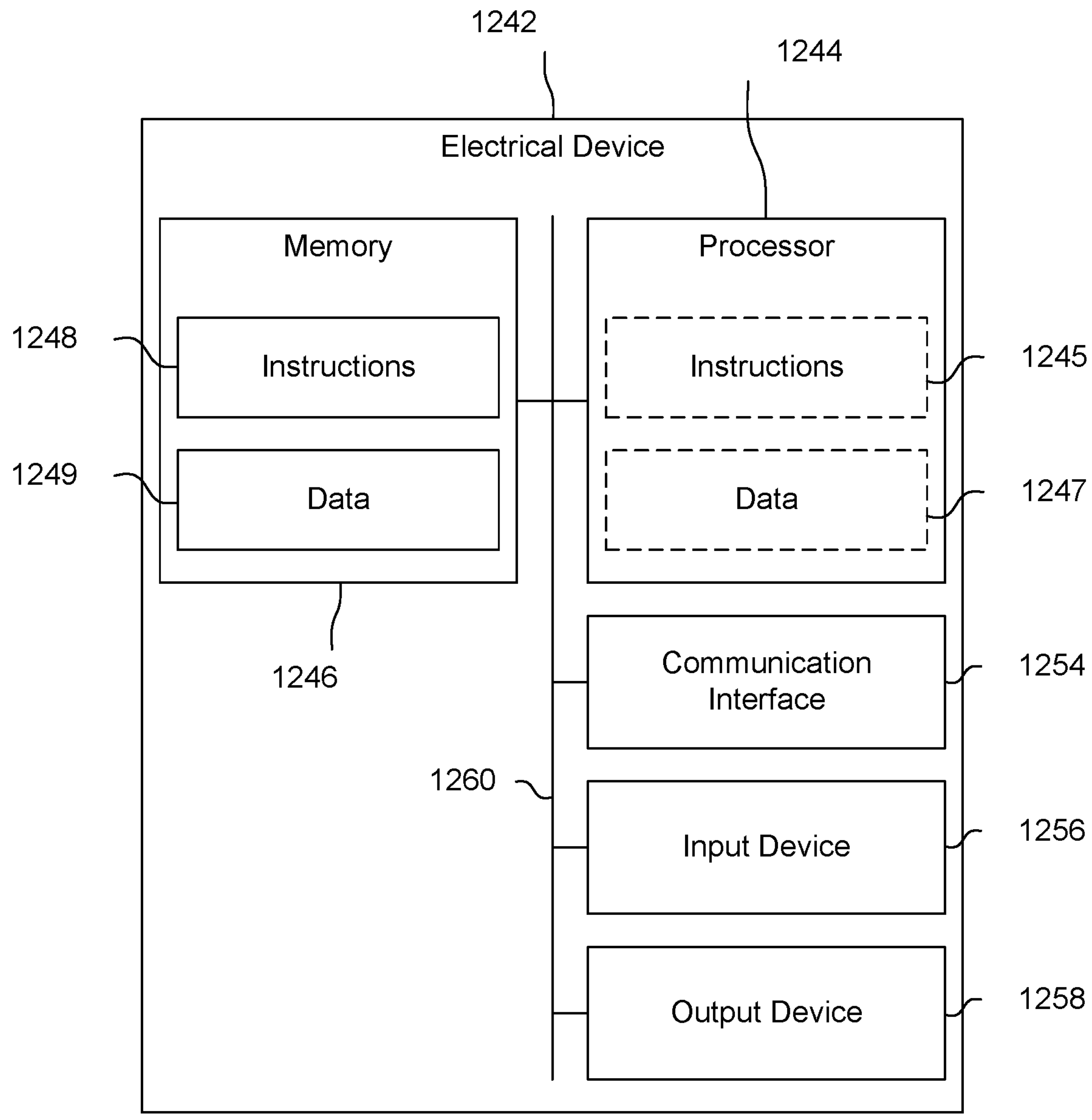
FIG. 12 illustrates various components that may be utilized in an electronic device, according to embodiments.

FIG. 12 is a block diagram illustrating an electronic device 1242 in which apparatuses, systems, and methods for determining and/or performing dimming operations may be embodied, instantiated, implemented, etc., according to embodiments. The electronic device 1242 may be an example of and/or include any of the electronic devices, components, elements, circuitry, etc., referenced in the above discussion of FIG. 1 through FIG. 7, such as for example, a power source, a DAC, a controller, dimmer circuitry, feedback circuitry, a dimmer, a TRIAC, etc. According to embodiments, the electronic device 1242 may be any of a mobile device (e.g., smartphone, tablet device, laptop computer, etc.), automation controller, light meter, smart speaker, and/or dimmer, etc. The electronic device 1242 may include one or more components or elements. One or more of the components or elements may be implemented in any of: hardware (e.g., circuitry), software (e.g., instructions performed by processing/computing resources), a combination of hardware and software (e.g., a processor with instructions), and a combination of hardware and firmware.

According to embodiments, the electronic device 1242 may include a processor 1244, a memory 1246, and/or one or more communication interface 1254. The processor 1244 may be coupled to and/or linked to (e.g., in electronic communication with) the memory 1246 and/or communication interface 1254. Although not shown, according to embodiments, the processor 1244 may include (e.g., internal, its own, etc.) memory. According to embodiments, the electronic device 1242 may be configured to perform one or more of the functions, procedures, methods, steps, etc., described in connection with one or more of FIG. 1-FIG. 7. According to embodiments, in conjunction with performing one or more of the functions, procedures, methods, steps, etc., the electronic device 1242 may include one or more of the structures described in connection with dimmer/dimming operations and features of one or more of embodiments discussed above and/or FIG. 1-FIG. 7.

The memory 1246 may store instructions and/or data. The processor 1244 may access (e.g., read from and/or write to) the memory 1246. According to embodiments, instructions and/or data that may be stored by the memory 1246 may include data reception instructions 1248, dimming information (e.g., command, configuration, dimming value, dimming instructions, etc.), and/or other instructions 1248 and/or data 1249, etc. For instance, the memory 1246 may store light sensor data, dimming settings data, and/or dimming profile data (e.g., first dimming setting, second dimming setting, and/or dimming curve data). The memory 1246 may be a non-transitory tangible computer-readable medium, and/or any other similar and/or suitable memory storage device or medium. Further, the processor 1244 may be configured to perform one or more of the operations described herein without a memory 1246. For instance, one or more operations may be implemented in hardware of the processor 1244 and/or the electronic device 1242 may not include the memory 1246.

According to embodiments, the communication interface 1254 may enable the electronic device 1242 to communicate with one or more other devices (e.g., light sensor(s), automation controller(s), dimmer(s), and/or one or more other devices). For example, the communication interface 1254 may provide an interface for wired and/or wireless communications. The communication interface 1254 may include any of a transmitter, a receiver, and/or a transceiver, for example, for any of wired, wireless, and/or optical communications. According to embodiments, the communication interface(s) 1254 may communicate with one or more other devices (e.g., light sensor(s), automation controller(s), dimmer(s), and/or one or more other devices) over one or more networks (e.g., the Internet, wide-area network (WAN), local area network (LAN), etc.). In some configurations, the communication interface 1254 may be coupled to one or more antennas for transmitting and/or receiving radio frequency (RF) signals. For example, the communication interface 1254 may enable one or more kinds of wireless (e.g., cellular, wireless local area network (WLAN), personal area network (PAN), mesh network, etc.) communication. Additionally, or alternatively, the communication interface 1254 may enable one or more kinds of cable and/or wireline (e.g., Universal Serial Bus (USB), Ethernet, High Definition Multimedia Interface (HDMI), fiber optic cable, etc.) communication.

According to embodiments, processor 1244 may execute the data reception instructions 1248 to receive, by the electronic device 1242, light sensor data from a light sensor. The light sensor data may indicate measurements of light produced by a lighting load over a range of dimming settings. In some examples, receiving the light sensor data may be associated with (e.g., a trigger for) dimming operations and features as described in relation to FIG. 1 through FIG. 7. For instance, the electronic device 1242 may receive light sensor data over a communication link from a remote light sensor and/or may receive light sensor data from a light sensor included in the electronic device 1242. According to embodiments, the light sensor data may be stored in the memory 1246. According to embodiments, light sensor data may be captured in response to a trigger from a user interface, for example, in a case where the electronic device 1242 includes and/or is communicably connected to a device providing a user interface (e.g., touchscreen, a display, a voice menu, a voice input, keyboard, mouse, etc.).

In such a case of responding to the trigger (e.g., a trigger associated with dimming operations) from the user interface, electronic device 1242 may initiate dimming operations, for example such as a dimming sweep. According to embodiments, the electronic device 1242 may receive a message (e.g., a trigger regarding dimming operations) from another device (e.g., mobile device) that includes a user interface that produced the trigger. According to embodiments, the electronic device 1242 may include a light sensor. According to embodiments, processor 1244 may execute dimming operations associated with dimming profile instructions 1245, for example, for determining a dimming profile (e.g., based on dimming profile data 1247) based on light sensor data and dimming settings data. According to embodiments, the electronic device 1242 may further include any of an input device 1256, for example for inputting information and/or receiving input information, and an output device

1258, for example, for outputting information to a user and/or another device. According to embodiments, dimming operations for determining the dimming profile may be performed as described in relation to one or more of FIG. 1-FIG. 7.

According to embodiments, the electronic device 1242 may send the dimming profile data to an automation controller and/or a to a dimmer to control the lighting load over the range of dimming settings. According to embodiments, the electronic device 542 may receive the dimming profile data from an automation controller and/or from a dimmer. The processor 1244 may utilize the light sensor data and the dimming settings data to determine the dimming profile as described herein. For instance, determining the dimming profile may include determining a first dimming setting at which the light sensor data indicates activation of the lighting load.

While examples of arrangements of devices for performing some examples of the techniques are described herein are given in relation to the Figures, other arrangements may be utilized in some examples. For instance, a dimmer including a light sensor may control a lighting load, capture light sensor data, and determine a dimming profile. In another example, a mobile device may control a dimmer, capture light sensor data, determine a dimming profile, and load the dimming profile to the dimmer. Other arrangements may be utilized in some examples.

As used herein, the term "couple" and other variations thereof (e.g., "coupled," "coupling," etc.) may mean that one element is connected to another element directly or indirectly. For example, if a first element is coupled to a second element, the first element may be connected directly to the second element (without any intervening element, for example) or may be connected to the second element through one or more other elements. A line(s) in one or more of the Figures (e.g., in the block diagrams) may indicate a coupling(s) and/or communication link(s). A coupling may be accomplished with one or more conductors (e.g., one or more wires). A communication link may be established with a wired link and/or wireless link. For instance, elements may communicate over a wired and/or wireless network (e.g., Ethernet network, Wi-Fi network, mesh network, Zigbee network, local area network (LAN), personal area network (PAN), wide area network (WAN), the Internet, etc.).

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components may refer to two or more components.

As used herein, the term "circuit," "circuitry" or variations thereof may refer to one or more electronic and/or electrical circuits. In some examples, a circuit may include one or more discrete components such as one or more resistors, capacitors, inductors, transformers, transistors, etc. Examples of circuitry may include dimming circuitry, a processor, an image sensor, etc. In some examples, circuitry may be included in an electronic device. In some configurations, an electronic device may be housed within a wall box.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

The invention claimed is:

1. An electronic device connected between a power source and a lighting load, the electronic device comprising:

dimmer circuitry converting an alternating current (AC) power signal provided by the power source into a load power signal consumed by the lighting load; and feedback circuitry generating a feedback signal for controlling a switching timing used by the dimmer circuitry converting the AC power signal into the load power signal, wherein the dimmer circuitry comprises a transistor for switching the AC power signal according to the feedback signal generated by the feedback circuitry, wherein the transistor is a metal oxide semiconductor field effect transistor (MOSFET) having a source terminal, a gate terminal, and a drain terminal, wherein the source terminal is connected to the AC power source and the drain terminal is connected to the lighting load, and wherein a voltage applied to the gate terminal of the MOSFET is varied according to the feedback signal.

2. The electronic device of claim 1, wherein a switching timing of the transistor is determined according to the feedback signal.

3. The electronic device of claim 1, wherein the dimmer circuitry further comprises a diode disposed in parallel with the MOSFET.

4. The electronic device of claim 1, wherein the dimmer circuitry further comprises an operational amplifier comprising:

an output terminal for providing the voltage applied to the gate terminal of the MOSFET; and input terminals for respectively receiving: (i) a timing signal from a digital to analog converter (DAC), and (ii) the feedback signal from the feedback circuitry.

5. The electronic device of claim 4, wherein the dimmer circuitry further comprises a resistor disposed between the output terminal of the operational amplifier and the gate terminal of the MOSFET.

6. The electronic device of claim 5, wherein the dimmer circuitry further comprises duplicates of any of the MOSFET, the diode, the operational amplifier, the resistor, and the feedback circuitry for operating during respective halves of the AC power signal.

7. The electronic device of claim 1, wherein the feedback circuitry determines a current flowing between the dimmer circuitry and the load.

8. The electronic device of claim 7, wherein the feedback signal is determined according to the current sensing between the dimmer circuitry and the load.

9. The electronic device of claim 1, wherein the feedback circuitry comprises resistor divider circuitry including at least two feedback resistors respectively connected between the load and respective transistors.

10. The electronic device of claim 1, wherein the feedback circuitry comprises a Hall effect sensor.

11. A method for generating feedback signaling for controlling an amount of power provided from an alternating current (AC) power source to an electrical load, the method comprising:

turning on dimmer circuitry and generating a load power signal provided to a load;

generating a feedback signal for controlling any of a voltage value, a timing, and a rate of change of a voltage applied to a gate of a metal oxide semiconductor field effect transistor (MOSFET); and controlling a transition through a threshold voltage of the MOSFET gate according to the feedback signal.

12. The method of claim 11, wherein the turning on dimmer circuitry comprises:

providing an AC power signal generated by the AC power source to a source terminal of the MOSFET;

providing a MOSFET gate voltage control signal generated by an operational amplifier according to both of a time control signal and the feedback signal; and providing a load power signal generated by the MOSFET to a load.

13. The method of claim 11, wherein the providing the feedback signal comprises the feedback circuitry providing the operational amplifier a feedback signal indicating information associated with the load.

14. A method for dimmer circuitry controlling an alternating current (AC) power signal provided to an electrical load, the method comprising:

converting, by the dimmer circuitry, the AC power signal into a load power signal consumed by the electrical load;

providing a feedback signal, generated by feedback circuitry, for controlling a switching timing used by the dimmer circuitry converting the AC power signal into the load power signal; and varying a voltage applied to a gate terminal of a transistor included in the dimmer circuitry according to the feedback signal;

wherein the voltage applied to the gate terminal switches on and off the AC power signal flowing between source and drain terminals of the transistor.

15. The method of claim 14, further comprising:

sensing, by the feedback circuitry, an amount of current flowing from the dimmer circuitry to the electrical load; and generating the feedback signal according to the current flowing from the dimmer circuitry to the electrical load.

16. The method of claim 15, further comprising:

switching, by the transistor included in the dimmer circuitry, the AC power signal on and off according to the feedback signal provided by the feedback circuitry; and generating the load power signal according to the switching of the AC power signal.

17. The method of claim 16, further comprising determining a switching timing of the transistor according to the feedback signal.

* * * * *